United States Patent [19]
Martin et al.

[11] Patent Number: 6,061,562
[45] Date of Patent: May 9, 2000

[54] WIRELESS COMMUNICATION USING AN AIRBORNE SWITCHING NODE

[75] Inventors: James N. Martin, Allen; J. Leland Langston, Richardson, both of Tex.

[73] Assignee: Raytheon Company, Lexington, Mass.

[21] Appl. No.: 08/961,385

[22] Filed: Oct. 30, 1997

[51] Int. Cl.$^7$ .................................................. H04Q 7/00
[52] U.S. Cl. .......................................... 455/431; 455/427
[58] Field of Search .................................. 455/13.3, 431, 455/430, 427, 428, 429

[56] References Cited

U.S. PATENT DOCUMENTS

| | | | |
|---|---|---|---|
| 5,212,804 | 5/1993 | Choate | 455/431 |
| 5,519,761 | 5/1996 | Gilhousen | 455/431 |
| 5,559,806 | 9/1996 | Kurby et al. | 455/13.3 |
| 5,559,865 | 9/1996 | Gilhousen | 455/431 |
| 5,642,358 | 6/1997 | Dent | 455/13.3 |
| 5,651,050 | 7/1997 | Bhagat et al. | 455/431 |
| 5,736,959 | 4/1998 | Patterson et al. | 455/13.3 |
| 5,878,345 | 3/1999 | Ray et al. | 455/431 |
| 5,878,346 | 5/1999 | Ray et al. | 455/431 |

FOREIGN PATENT DOCUMENTS

| | | |
|---|---|---|
| 06 006 99 A1 | 6/1994 | European Pat. Off. |
| WO 93/09613 | 5/1993 | WIPO . |
| WO 97/07609 | 2/1997 | WIPO . |
| WO 97/21282 | 6/1997 | WIPO . |

OTHER PUBLICATIONS

Djuknic, et al., "Establishing Wireless Communications Services via High–Altitude Aeronautical Platforms: A Concept Whose Time Has Come?" *IEEE Communications Magazine*, Sep., 997, 8 pages.

Angel Technologies Corporation Web Page, (http://www.angelcorp.com/index.htm), *Angel Technologies Corporation*, Oct., 1997, 21 pages.

Pelton, Joseph N., "Wireless and Satellite Telecommunications: The Technology, the Market & the Regulations", Prentice–Hall, 2 title pages, pp. 12, 58, 61, 93–94, 98, 146, 152–153, 160, 170, 221, 228–232; 1995.

Martin, et al., "Broadband Wireland Services from High Altitude Long Operation (HALO™) Aircraft", SPIE, vol. 3232, p. 9, 1998.

Ayyagari, et al., "Airborne Information and Reconnaissance Network", 1996 IEEE, pp. 230–234.

Samejima, Shuichi, "Phased Array Antenna Systems for Commerial Applications in Japan", 1996 IEEE, p. 237.

*Primary Examiner*—Thanh Cong Le
*Assistant Examiner*—Thuan T. Nguyen
*Attorney, Agent, or Firm*—Baker Botts L.L.P.

[57] ABSTRACT

A communication system includes an aircraft supporting an airborne switching node that provides communication services to a variety of ground-based devices located in the service region. The devices include subscriber devices, such as customer premises equipment and business premises equipment, as well as gateway devices.

48 Claims, 6 Drawing Sheets

WIRELESS COMMUNICATION USING AN AIRBORNE SWITCHING NODE

TECHNICAL FIELD OF THE INVENTION

This invention relates generally to wireless communication, and more particularly to wireless communication using an airborne switching node.

BACKGROUND OF THE INVENTION

In this age of information, there is a need for communication systems that provide the connectivity and capacity to meet increasing user demands. Data-intensive applications such as remote computing, Internet browsing, multimedia communication, and others place significant strain on the existing communication infrastructure. The public switched telephone network (PSTN), long-haul data networks, and other developed wireline and wireless networks cannot meet these demands.

One approach to increasing connectivity and capacity is to upgrade the existing terrestrial infrastructure. New terrestrial systems include wireless data service at the personal communications services (PCS) frequency band, data transport over coaxial cable installed for cable television, or an assortment of digital subscriber line services over twisted wire pairs installed for telephone networks. These terrestrial solutions require significant time to prepare for and install the infrastructure before service can be provided, and also require costly maintenance of the equipment due to vandalism, lightning, provision changes, frequency reassignments, and the retuning of radiofrequency (RF) equipment. Also, terrestrial solutions suffer from Rayleigh fading caused by interference scattering from terrain and buildings, which demands high dynamic range and sophisticated equipment to compensate for extreme variations in received signal strength.

Another approach to increasing connectivity and capacity is to upgrade the satellite-based infrastructure operating in geo-synchronous orbit (GEO) and low-earth orbit (LEO). Like terrestrial systems, satellite systems often take years to deploy fully, especially large constellation LEO systems. Also, satellite systems are costly to maintain or upgrade. Consequently, satellite systems include proven communication technology designed to operate reliably in a harsh radiation environment, which significantly increases the system cost and reduces system capacity. Satellite systems also suffer from limited weight and power capacities, and fail to provide the desired circuit density to service densely populated areas.

SUMMARY OF THE INVENTION

In accordance with the present invention, a communication system and method are provided that substantially eliminate or reduce disadvantages or problems associated with previously developed communication systems and methods. In particular, the present invention provides wireless communication using an airborne switching node.

In one embodiment of the present invention, a system for providing communication to a service region having a number of cells includes an aircraft flying above the service region. An airborne switching node coupled to the aircraft includes a phased array antenna that electronically directs a number of beams to the cells in the service region. The airborne switching node also includes a switch that couples data received from a first cell to the antenna for transmission to a second cell (or to a different subscriber in the same cell). A number of devices located in the cells of the service region communicate data with the airborne switching node.

In another embodiment of the present invention, an airborne switching node located on an aircraft for providing communication to a service region having a number of cells includes a phased array antenna that electronically directs a number of beams to the cells in the service region. A switch couples data received from a first cell to the antenna for transmission to second cell. A payload adapter mechanically adjusts the orientation of the antenna in response to aircraft movement to direct the beams to the cells in the service region.

In yet another embodiment of the present invention, an apparatus communicates with an airborne switching node located on an aircraft. The airborne switching node includes a phased array antenna that electronically directs a beam to a cell that includes the apparatus. The apparatus includes an antenna to receive packet data communicated in the beam and an RF unit coupled to the antenna. The apparatus further comprises a network interface unit coupled to the RF unit to extract the packet data and an information appliance coupled to the network interface unit to process the packet data.

Technical advantages of the present invention include an airborne switching node (ASN) carried by an aircraft orbiting at a high altitude (e.g., 52,000 to 60,000 feet) above a service region. The ASN provides communication services to ground-based devices, such as subscriber devices and gateway devices located in cells of the service region. Subscriber devices include customer premises equipment (CPE) and business premises equipment (BPE) that process and communicate voice, video, and data at broadband and/or narrowband rates. Gateway devices operate to link the ASN to the public switched telephone network (PSTN), Internet service providers (ISPs), cable or video service providers, or other networks within or outside the service region of the ASN.

Other important technical advantages of the present invention include an ASN having a phased array antenna that electronically directs beams to predefined geographic cells in the service region. The phased array antenna maintains beams on selected cells or provides frequent beam handoffs between cells as the ASN orbits above the service region. In a particular embodiment, the ASN includes a memory that stores an association between beams and serviced cells and a packet switch that accesses this memory to compensate for beam handoff. In addition to electronic beam steering using the phased array antenna, the ASN may also include an adapter that mechanically adjusts the orientation of the antenna to direct the beams to the cells in the service region.

The ASN eliminates the need for base station equipment and facilities associated with terrestrial systems, such as antenna towers, cell site buildings, and cell site land. In a particular embodiment, links between ground-based devices and the ASN have a minimum line-of-sight (LOS) of approximately twenty degrees to minimize interference from terrestrial systems. In a particular embodiment, isolation between ASN communication and other terrestrial systems is sufficient to allow reuse of designated terrestrial frequencies, such as the local multipoint distribution service (LMDS) frequency band. The ASN also eliminates significant "backhaul" infrastructure through the use of gateway devices to provide direct access to the PSTN, ISPs, and other network interfaces. The ASN also benefits from higher power, increased payload capacity, a less complicated thermal management system, and increased subscriber density as compared to satellite systems.

The present invention also provides a rapidly deployable and flexible technique to provide modular and scalable communication services with sufficient circuit density for high population areas. One application rapidly locates and deploys an ASN-based communication network for emergency or military use. Since a fleet of aircraft (e.g., three aircraft in eight hour shifts) provide communication, each aircraft and associated ASN benefits from continuous service, modifications, and upgrades to incorporate lighter, cheaper, and faster digital communication technologies. Also, since the aircraft operate at high altitudes, the ASN supports low attenuation, high frequency, LOS communication links to satellites or other ASNs servicing adjacent regions. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
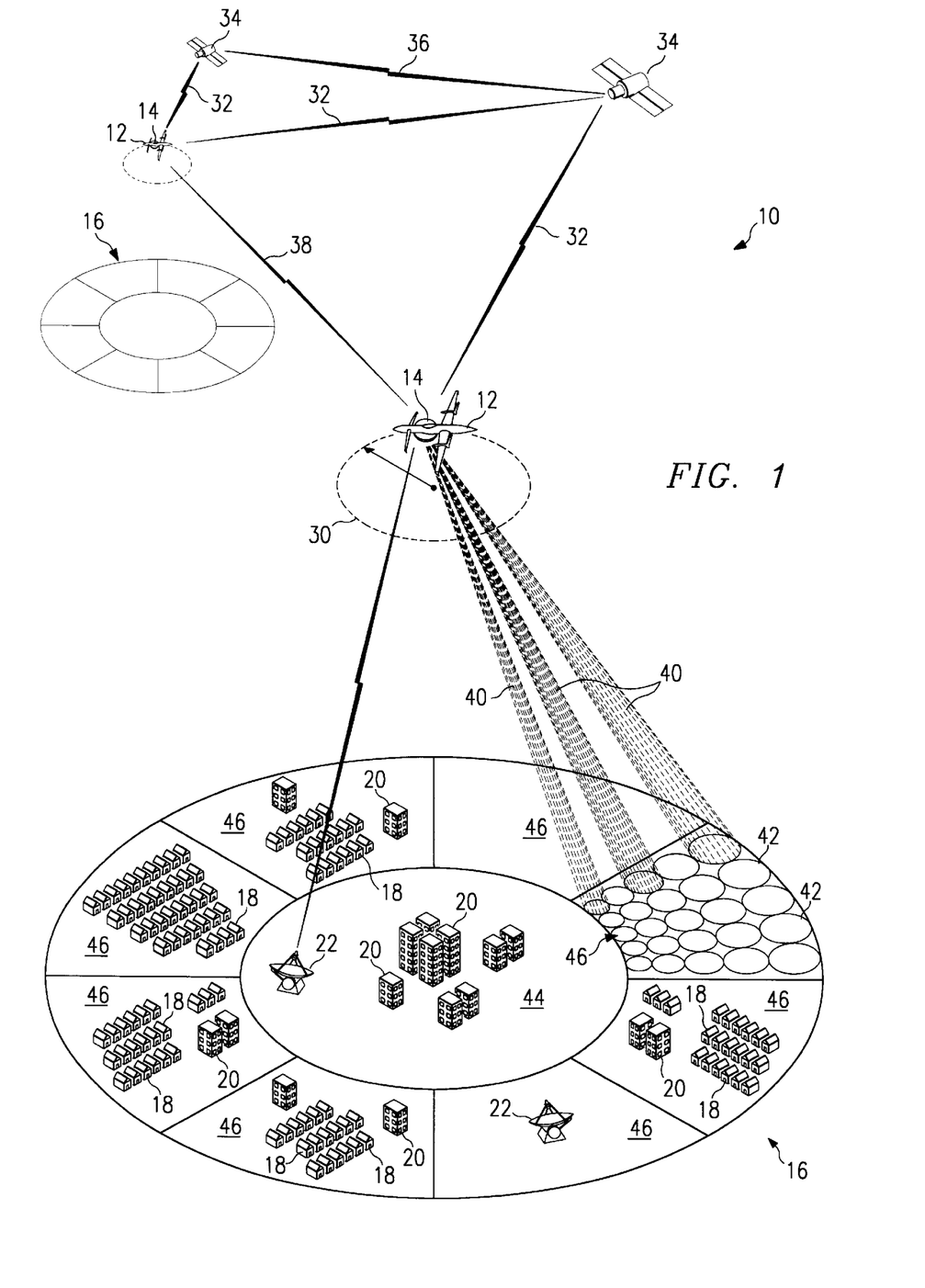
FIG. 1 illustrates a communication system including an airborne switching node (ASN)

FIG. 1 illustrates communication system 10 that includes an aircraft 12 supporting an airborne switching node (ASN) 14 to provide communication services to a variety of ground-based devices located in a service region 16. The ground-based devices include subscriber devices, such as customer premises equipment (CPE) 18 and business premises equipment (BPE) 20, as well as gateway devices 22. In general, ASN 14 provides wireless broadband and/or narrowband communication between a variety of devices in service region 16.

A high-lift, composite material aircraft 12 carries ASN 14 in a predefined orbit 30 above service region 16. Orbit 30 may be circular, elliptical, a figure eight configuration, or any other suitable orbit to maintain ASN 14 positioned above service region 16. By circling at high altitudes for extended time periods, aircraft 12 provides a stable platform for ASN 14 to implement a wireless cellular communication network. In a particular embodiment, aircraft 12 maintains a station at an altitude of between 52,000 and 60,000 feet by flying in a circle with a diameter of approximately five to eight miles. Three aircraft 12 flying eight hour missions each can provide continuous communication capabilities to service region 16 for twenty-four hours a day, seven days a week.

Aircraft 12 and associated ASN 14 can provide coverage of up to 2,800 square miles of a metropolitan area with a viewing angle of twenty degrees or greater to facilitate good line-of-site (LOS) coverage at millimeter waves (MMW) frequencies of 20 GHz or higher. Operation at MMW frequencies enables delivery of broadband communication services (e.g., 1 Gbps to 10 Gbps) to subscriber devices in service region 16. Since communication system 10 operates at MMW frequencies, very narrow and focused beamwidths can be realized using small antenna apertures in ASN 14, CPE 18, BPE 20, and gateway devices 22.

Since aircraft 12 orbits above most of the earth's atmosphere, ASN 14 may maintain a satellite link 32 to low-earth orbit (LEO) and/or geo-synchronous orbit (GEO) satellites 34. In a particular embodiment, link 32 operates in a 60 GHz band for good immunity from ground-based interference and allows for isolation from inter-satellite links 36. Adjacent ASNs 14 servicing adjacent service regions 16 may communicate through one or more satellites 34 using satellite links 32 and inter-satellite links 36, or may communicate directly using infrared, microwave, or other suitable inter-ASN link 38. The 60 GHz band is typically used for links 36 since at this frequency there is too much absorption in the atmosphere to communicate with the ground. But since ASN 14 is above most of the atmosphere, the 60 GHz band also supports links 32 from ASN 14 to satellite 34. Interference between links 32 and links 36 is reduced since a very narrow beam would be used and since links 32 are slanted, whereas links 36 are relatively horizontal. Service region 16 may be a metropolitan area, a designated emergency zone, a military region, or other geographic region requiring broadband and/or narrowband wireless services.

ASN 14 includes a phased array antenna that electronically directs beams 40 to cells 42 within service region 16. For discussion purposes and clarity, FIG. 1 illustrates beams 40 directed to selected cells 42 in service region. However, communication system 10 contemplates continuous or intermittent direction of beams 40 to each area in service region 16. Service region 16 comprises a center sector 44 and a number of surrounding sectors 46 that each include a selected subset of cells 42 in service region 16. In a particular embodiment, each sector 44 and 46 corresponds to a different portion of the phased array antenna of ASN 14. As described below in more detail, beams 40 may be always associated with particular cells 42 in particular sectors 44 and 46, or beams 40 may sweep or handoff between cells as aircraft 12 and ASN 14 travel through orbit 30.

In a particular embodiment, gateway 22 located in center sector 44 near the center of orbit 30 reduces the slant range between gateway 22 and ASN 14, and hence the signal path length through heavy rainfall. This arrangement ensures a high availability of maximum data rates, a higher availability of reduced data rates above an acceptable minimum, and limits outages to small areas due to the interception of the signal path by dense rain columns. To increase data rate and reliability, gateway 22 may communicate with ASN 14 using a dedicated, high-gain, mechanically gimballed antenna (e.g., parabolic) separate from the phased array antenna on ASN 14 servicing CPE 18 and BPE 20.

The cellular pattern formed by beams 40 from ASN 14 may use any suitable multiplexing or separation technique to reduce interference between adjacent cells 42. In a particular embodiment, each cell 42 uses one of a number frequency sub-bands for communication with subscriber devices (e.g., CPE 18 and BPE 20) with each frequency sub-band having an associated bandwidth for communication in both the transmit and receive direction. In this embodiment, a separate sub-band supports communication between ASN 14 and gateways 22. Using the local multipoint distribution service (LMDS) band at 28 GHz, communication system 10 reuses the entire bandwidth many times within service region 16 to achieve approximately 2,800 square miles of coverage for ASN 14. The total capacity of communication system 10 with a single ASN 14 may be 100 Gbps or greater. This capacity provides two-way broadband multimedia services normally available only via terrestrial fiber optic networks.

Communication system 10 with ASN 14 provide a variety of advantages over terrestrial or satellite systems. Unlike satellite systems, communication system 10 concentrates all of the spectrum usage in certain geographic areas, which minimizes frequency coordination problems and permits sharing of frequency with ground-based systems, such as LMDS. Furthermore, ASN 14 operates at a high enough power to allow broadband data access by CPE 18 maintained at a residential site. ASN 14 eliminates the need for base station equipment and facilities associated with terrestrial systems, such as antenna towers, cell site buildings, and cell site land. ASN 14 also benefits from higher power, increased payload capacity, a less complicated thermal management system, and increased subscriber density as compared to satellite systems. Generally, communication system 10 with ASN 14 provides a rapidly deployable and flexible technique to provide modular, scalable, upgradeable, and relatively low-cost communication services with sufficient circuit density for high population areas.

In operation, aircraft 12 flies in an orbit 30 to maintain ASN 14 at an altitude above service center 16. The phased array antenna in ASN 14 electronically directs beams 40 to cells 42 in sectors 44 and 46 of service region 16. An originating device (e.g., CPE 18, BPE 20, gateway 22) located in a first cell 42 transmits data to ASN 14 using a first beam 40 servicing the first cell 42. A switch in ASN 14 couples the data received from the originating device to the phased array antenna for transmission to a destination device (e.g., CPE 18, BPE 20, gateway 22) located in a second cell 42 serviced by a second beam 40. In this manner, ASN 14 implements a star topology to interconnect any two devices within service region 16.

In a particular embodiment, the destination device could also be located in the same cell as the originating device. ASN 14 supports multiple subscriber channels within a given beam 40, with each channel separated by time division multiple access (TDMA), code division multiple access (CDMA), frequency division multiple access (FDMA), or other appropriate channel separation technique. For communication between subscribers in the same beam 40, ASN 14 receives packet data from the originating device in the first cell 42 and directs the packet data to the antenna for transmission to a second subscriber in the first cell 42 to allow for channel-to-channel communication within the same beam 40.

Most service regions 16 (e.g., metropolitan areas, emergency zones, military regions) will fit within a footprint of forty to sixty miles in diameter. However, multiple, networked ASNs 14 may provide an overlapping coverage in areas that exceed this size or require increased capacity. For example, four or more ASNs 14 may provide an overlapping coverage area to the New York City metropolitan area to provide higher reliability links and to reduce the blocking factor on requests for service.

Communication system 10 provides various classes of services. A typical consumer service for CPE 18 may comprise 1 Mbps to 5 Mbps links, whereas a typical business service for BPE 20 may comprise 5 Mbps to 12.5 Mbps per service link. Using asynchronous transfer mode (ATM) or other packet switch protocol, these links provide bandwidth on demand (BOD) so that the total available spectrum may be time-shared between the various active sessions with CPEs 18 and BPEs 20. The nominal data rates may be low, while the peak data rates would expand to a specified level. Gateways 22 may comprise similar time-shared BOD links or higher priority "dedicated" links of 25 Mbps to 155 Mbps or higher. The capacity for a typical communication system 10 is 10,000 to 75,000 simultaneous, symmetrical T1 circuits (1.5 Mbps) for each ASN 14. Therefore, the total urban and rural coverage from a single ASN 14 comprises 100,000 to 750,000 subscribers in a forty to sixty mile diameter service area 16 (1,250 to 2,800 square miles).

Figure 2:
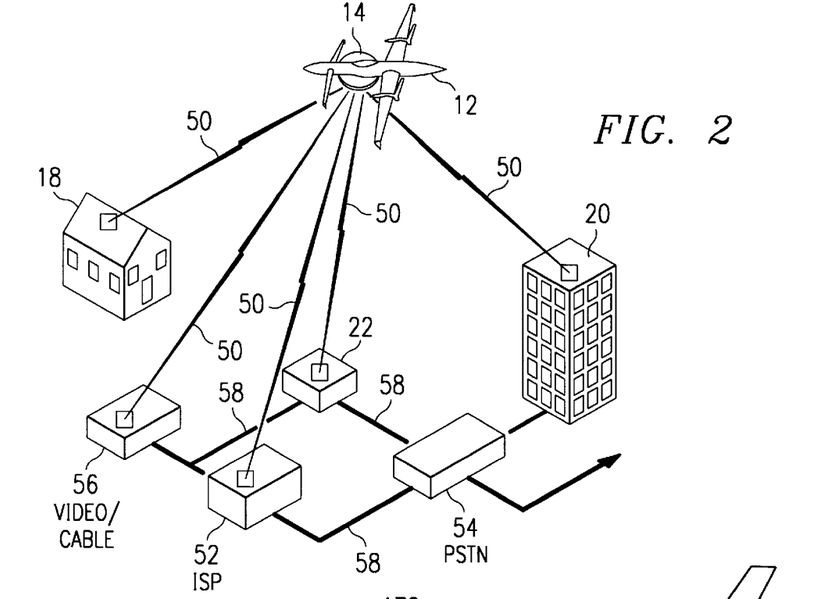
FIG. 2 illustrates in more detail components of the communication system.

FIG. 2 illustrates in more detail components in communication system 10. Generally, ASN 14 represents the hub of a star topology network for routing packet data between any two devices within service area 16. A single hop across ASN 14 comprises two links 50, with each link 50 coupling ASN 14 to CPE 18, BPE 20, or gateway 22. Packet data accommodates both connection-less and connection-oriented (e.g., virtual circuits) communication, but in a particular embodiment, packet data comprises any packet, grouping, or arrangement of data communicated in a connection-less environment that supports bandwidth on demand (BOD). Links 50 are broadband or narrowband, wireless, and line-of-sight.

CPE 18, BPE 20, and gateway 22 (referred to generally as devices) all perform similar functions. These devices include a high-gain antenna that automatically tracks ASN 14 to extract modulated signals conveyed over link 50 using MMW frequencies. The devices then convert the extracted signals into digital data, perform standards-based or proprietary data communication protocols, and route the digital data to a variety of information appliances. Although CPE 18, BPE 20, and gateway 22 may vary in size, complexity, and cost, some of the technologies and components in both hardware and software may be common to all designs. CPE 18 provides a personal gateway to communication system 10 serving the consumer, and BPE 20 provides a gateway for the business requiring higher data rates. Gateway 22 provides infrastructure and highly reliable, high bandwidth communication to link ASN 14, CPE 18, and BPE 20 to Internet service providers (ISPs) 52, PSTN 54, video and/or cable servers 56, and other local and remote network services. ISPs 52, PSTN 54, and video and/or cable servers 56 may couple directly to ASN 14 using suitable premises equipment, or through gateway 22 over high bandwidth wireless or wireline links 58, such as microwave, optical cable, or other suitable media.

Figure 3:
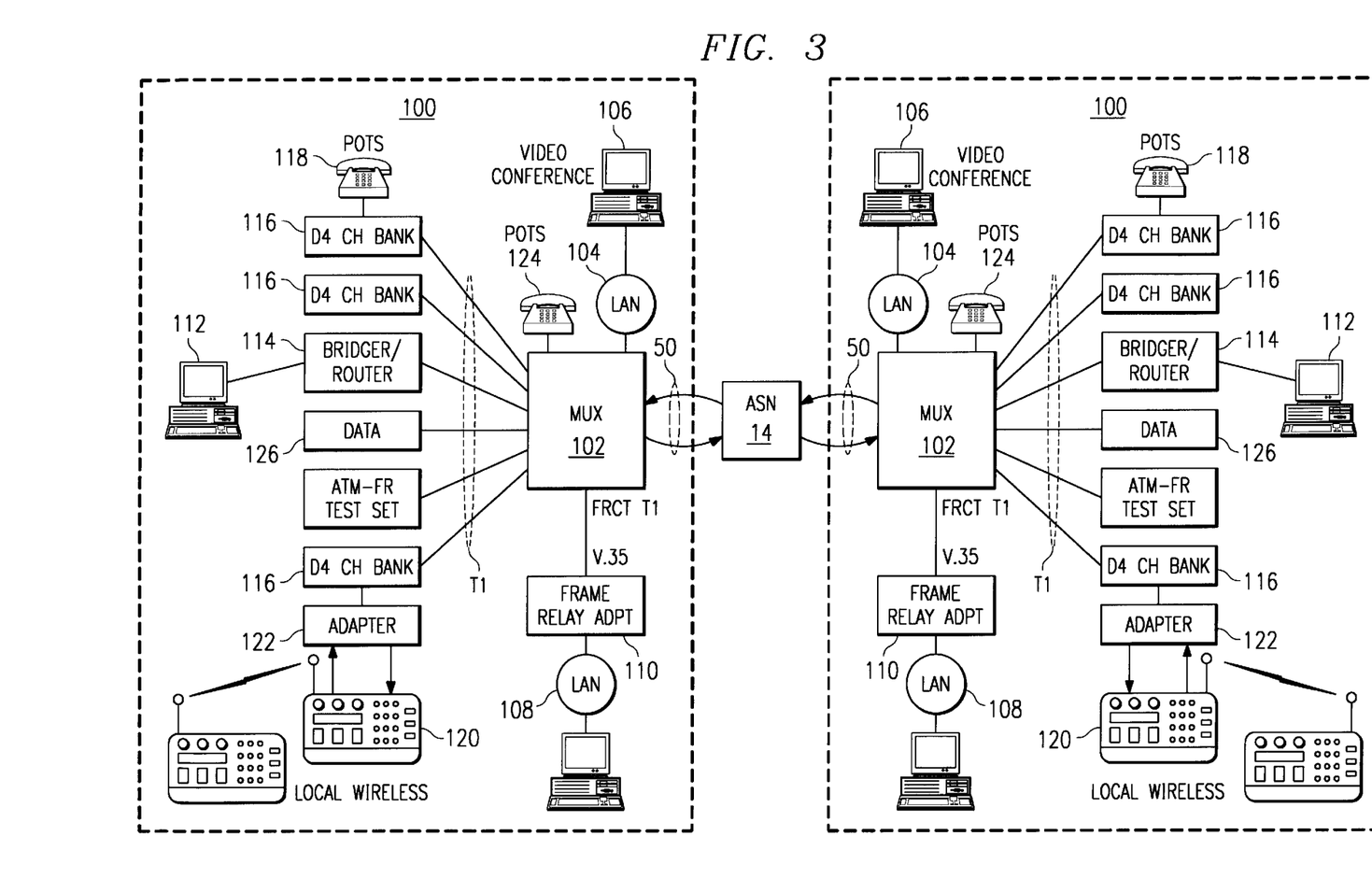
FIG. 3 illustrates a variety of communication protocols and equipment supported by devices linked through the ASN.

FIG. 3 illustrates the variety of communication protocols and equipment supported by communication system 10. ASN 14 interconnects two devices 100 using links 50 to provide up to broadband data service using MMW carrier frequencies. Devices 100 represent the collection of communication protocol and equipment that may be in CPE 18, BPE 20, and gateway 22.

Each device 100 includes a high bandwidth multiplexer 102 coupled to links 50. Multiplexer 102 communicates packet data, such as ATM packets, between links 50 and a variety of communication equipment in device 100. In one embodiment, multiplexer supports synchronous optical network (SONET) protocols, such as OC-1 (52 Mbps), OC-3 (155 Mbps), OC-12 (622 Mbps), or other high bandwidth communication protocol. The use of standard SONET and ATM protocols in a packet-switched environment allows ASN 14 to provide bandwidth on demand (BOD) services using a wide variety of voice, data, and video components. Also, as described below, ASN 14 may include an ATM packet switch that promotes efficient, scalable, and modular communication between devices 100 in service region 16.

Multiplexer 102 directly couples to local area network (LAN) 104 to support video conferencing services 106. Multiplexer 102 also couples to LAN 108 using a fractional T1 connection supporting V.35 protocol and a frame relay adapter 110. Device 100 also supports direct access to one or more computers 112 in a local area or wide area network (WAN) through a connection between multiplexer 102 and appropriate bridgers and/or routers 114. Device 100 includes T1 connections to D4 channel banks 116 to provide plain old telephone service (POTS) 118, local wireless service 120 through adapter 122, or other voice, video, or data service supported by D4 channel bank 116. Device 100 also supports POTS service through a direct connection between multiplexer 102 and POTS 124 and internal or external connections to long-haul data networks using data interface 126.

Device 100 in FIG. 3 illustrates particular communication protocols and equipment, but it should be understood that device 100 may support any protocol and equipment that communicates or processes voice, video, and data in communication system 10. For example, T1 links may comprise T3, E1, E3, or other suitable digital communication links. Similarly, LAN 104, LAN 108, and computers 112 may implement Ethernet, fast Ethernet, gigabit Ethernet, switched Ethernet, or other networking protocol. Also, D4 channel banks 116 may comprise any other suitable communication technology that provides an interface between multiplexer 102 and a variety of information networks and information appliances included in and provided outside of device 100.

In operation, ASN 14 interconnects devices 100 to provide telephony and data communication, local wireless service, LAN/WAN interconnection (bridging/routing), graphical data transmission, video transmission, and connectivity with other systems, such as long-haul data networks using D4 channel bank 116 or data interface 126. ASN 14 transports frame relay, LAN/WAN, T1, V.35, and other traffic using packet switching, such as ATM switching. One important aspect of the present invention is the use of end-to-end ATM or ATM-like protocols to support packet data transport and switching at ASN 14. The communication of packet data by devices 100 promotes efficient use of the bandwidth in link 50 and, in a particular embodiment, compensates for frequent beam handoffs between cells 42 as aircraft 12 and ASN 14 orbit above service region 16.

Figure 4A:
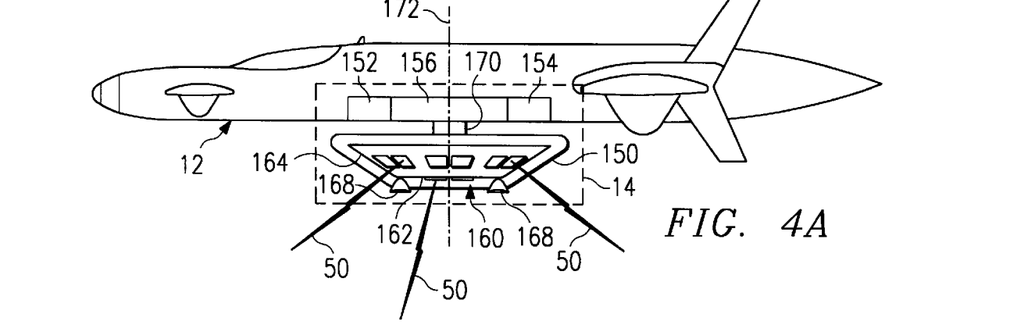
FIG. 4 illustrates the ASN coupled to an aircraft.
Figure 4B:
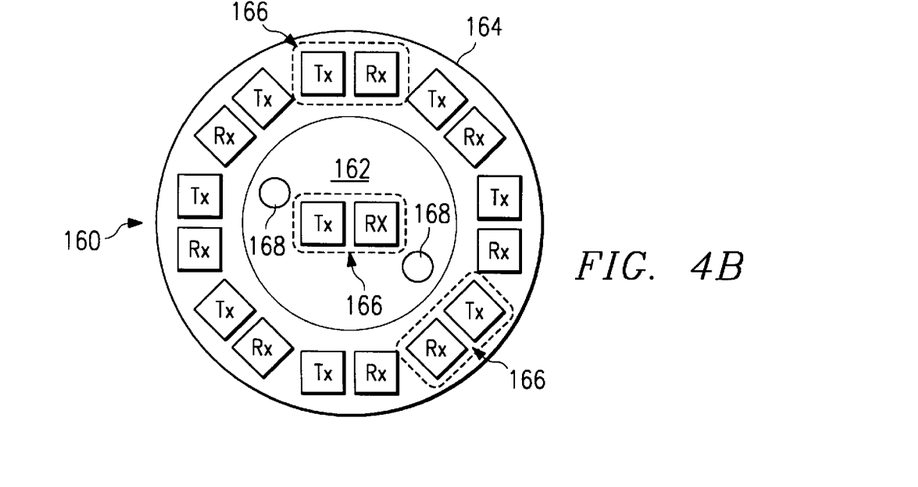

FIG. 4 illustrates in more detail ASN 14 mounted on aircraft 12. Aircraft 12 is a high-lift, composite material aircraft incorporating turbo-fan propulsion that operates at high altitude (e.g., 52,000 to 60,000 feet) for an extended duration (e.g., eight to twelve hours). Aircraft 12 carries portions of ASN 14 both within its fuselage and in a payload pod 150 suspended below the fuselage of aircraft 12. The portions of ASN 14 within the fuselage of aircraft 12 include cooling equipment 152, power equipment 154, and communication equipment 156.

Pod 150 contains a phased array antenna 160 that comprises a substantially horizontal section 162 surrounded by an angled rim 164. A number of transmit/receive pairs 166 mount on horizontal section 162 and angled rim 164 of antenna 160. In a particular embodiment, transmit/receive pairs 166 mounted on horizontal section 162 service cells 42 in center sector 44 of service area 16, whereas transmit/receive pairs 166 mounted on angled rim 164 service cells 42 in surrounding sectors 46 of service region 16. The particular arrangement of transmit/receive pairs 166 on antenna 160 shown in FIG. 4 service one central sector 44 and eight surrounding sectors 46. Each transmit/receive pair may comprise two 16×16, thirty inch square phased array elements. Transmit/receive pairs 166 may be added, removed, or arranged on antenna 160 in a modular fashion to provide a variety of communication capabilities.

Pod 150 may also contain a dedicated, high-gain, mechanically gimballed gateway antenna 168 for communication with each gateway 22 in service region 16. Antenna 168 may be parabolic with at least two gimbal axes to direct antenna 168 to gateway 22. Antenna 168 provides increased gain over transmit/receive pairs 166, which provides higher data rates and increased reliability on links between ASN 14 and gateway 22. Like transmit/receive pairs 166, gateway antenna 168 may be added, removed, or arranged in a modular fashion to provide a variety of communication capabilities.

Antenna 160 generates platform-fixed beams, earth-fixed beams, or a combination of platform-fixed and earth-fixed beams. For platform-fixed beams, each transmit/receive pair 166 maintains a fixed field-of-view directed at a fixed angle relative to antenna 160. The total field-of-view for ASN 14 is the sum of the fields of view of the individual transmit/receive pairs 166. The platform-fixed beam approach requires frequent beam handoff as beams 40 sweep across cells 42 as aircraft 12 and ASN 14 orbit above service region 16. A packet switch in communication equipment 156 compensates for beam handoff by maintaining an association between beams 40 and cells 42 serviced by beams 40. In a particular embodiment, antenna 160 electronically steers beams 40 to compensate for movements of aircraft 12 and to keep beams 40 stable and fixed over their associated cells 42 during the period of time that they service cells 42.

For earth-fixed beams, antenna 160 electronically steers each beam 40 so that it remains fixed on its associated cell 42 as aircraft 12 and ASN 14 proceed along orbit 30. This approach results in more electronic and physical complexity for antenna 160, but lessens the burden on communication equipment 156 since beam handoffs may be greatly reduced or eliminated. Each transmit/receive pair 166 maintains a wider field-of-view for steering throughout service area 16 to maintain each beam 40 on a permanently designated or assigned cell 42 in service region 16. Steerability of beams 40 in either a platform-fixed or earth-fixed approach may allow for the avoidance of gaps in the required coverage due to lakes, oceans, deserts, and sparsely populated areas. Antenna 160 may also use a hybrid approach that incorporates both platform-fixed and earth-fixed techniques.

Pod 150 couples to aircraft 12 using an adapter 170 that mechanically adjusts the orientation of antenna 160 to direct beams 40 to cells 42 in service region 16. In one embodiment, adapter 170 includes one or more gimbals, joints, or other suitable mechanical coupling in the pitch, roll, and/or yaw axes to provide active or passive orientation adjustments that compensate for the bank of aircraft 12 as it travels along orbit 30. Adapter 170 may also actively compensate for flutter and other high frequency aircraft movements to maintain antenna 160 in a substantially horizontal orientation. Using an earth-fixed beam steering technique, adapter 170 may rotate antenna 160 about axis 172 to maintain a substantially constant compass orientation of antenna 160. In this embodiment, adapter 170 rotates antenna 160 at a rate substantially equal to the orbital rate of aircraft 12.

Figure 5:
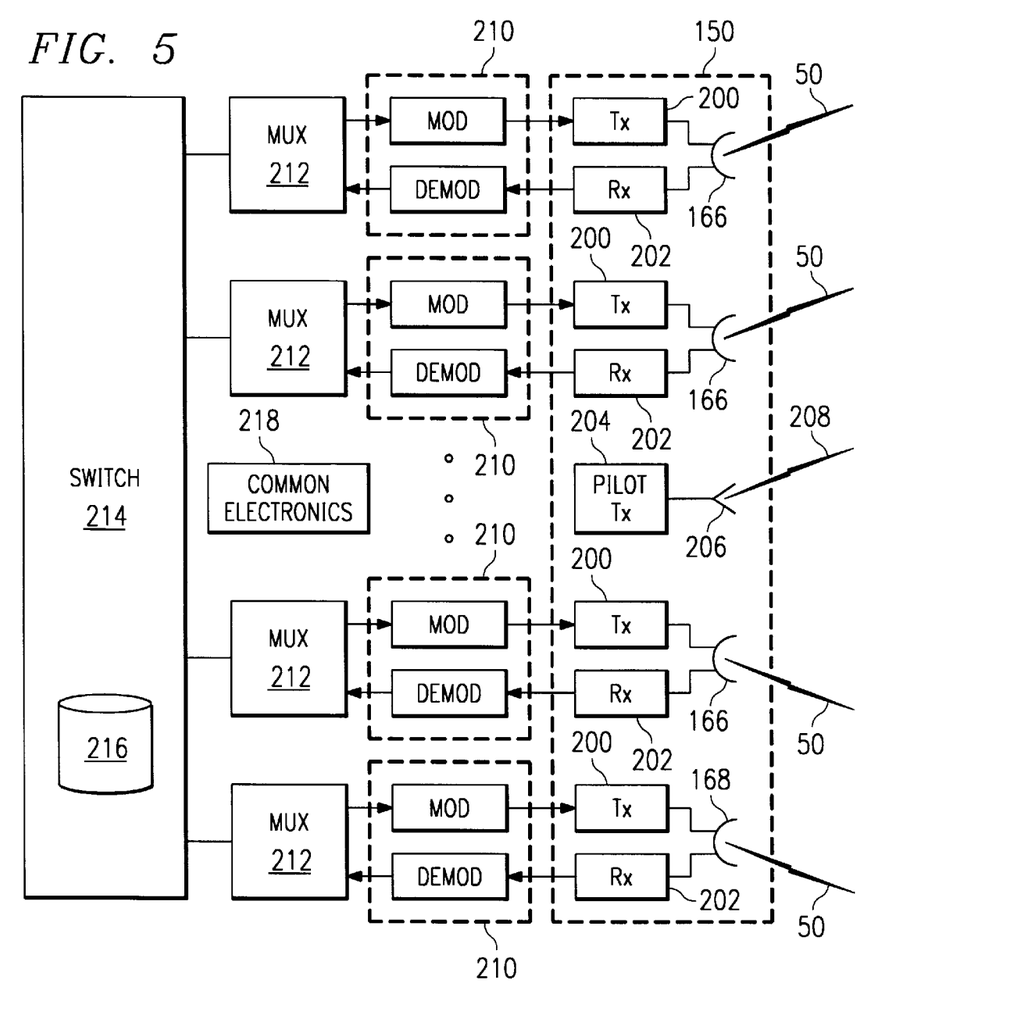
FIG. 5 illustrates in more detail components of the ASN.

FIG. 5 illustrates in more detail the components of ASN 14. Pod 150 mounted below aircraft 12 includes a radiofrequency (RF) transmit module 200 and an RF receive module 202 for each transmit/receive pair 166 or gateway antenna 168. In addition to user data, transmit module 200 and receive module 202 may incorporate an uplink control channel and a downlink control channel, respectively. Pod 150 also houses a pilot transmitter that includes a pilot transmit module 204 and associated antenna 206. The pilot transmitter transmits a pilot signal 208 used by ground-based devices for antenna tracking and power control. In a particular embodiment, pilot signal 208 is a single tone recognized by specific tracking circuitry at the ground-based device.

ASN 14 also includes a modem 210 and a multiplexer 212 for each transmit/receive pair 166 and gateway antenna 168. A switch 214 coupled to each multiplexer 212 provides interconnection of data in communication system 10. Switch 214 includes database 216 that stores information on each cell 42 in service region 16 and associated beams 40 formed by transmit/receive pairs 166 to service cells 42. Database 216 also maintains suitable customer, addressing, routing, and mapping information to perform asynchronous transfer mode (ATM) or other suitable packet switching technique. Database 216 may comprise random access memory (RAM), read only memory (ROM), magnetic or optical devices, or any other suitable memory. Common electronics 218 include power supplies, processors, and other hardware and software to support the operation of ASN 14.

In operation, an originating device in an originating cell 42 transmits packet data over link 50 to ASN 14. Transmit/receive pair 166 forming an originating beam 40 servicing originating cell 42 passes the packet data to receive module 202 for down converting and suitable RF processing. Demodulator in modem 210 then extracts the digital packet data and passes this information to multiplexer 212. Using SONET or other suitable protocol, multiplexer 212 passes the packet data to switch 214 for routing.

Switch 214 retrieves addressing or routing information from the packet data, associates this information with a particular subscriber or destination device, determines an associated destination cell 42, and determines a destination beam 40 servicing the destination cell 42. Upon determining destination beam 40, switch 214 routes the packet data to the appropriate multiplexer 212 servicing transmit/receive pair 166 that forms destination beam 40. Multiplexer 212 combines the packet data with other packet data to the same transmit/receive pair 166 and passes this information to the modulator in modem 210 for delivery to transmit module 200. Transmit/receive pair 166 communicates the modulated RF signal containing the packet data to destination cell 42 using destination beam 40. The destination device receives the packet data and translates the packet data into digital information for further processing. ASN 14 performs a similar operation for communication that involves gateway 22 and gateway antenna 168.

Figure 6:
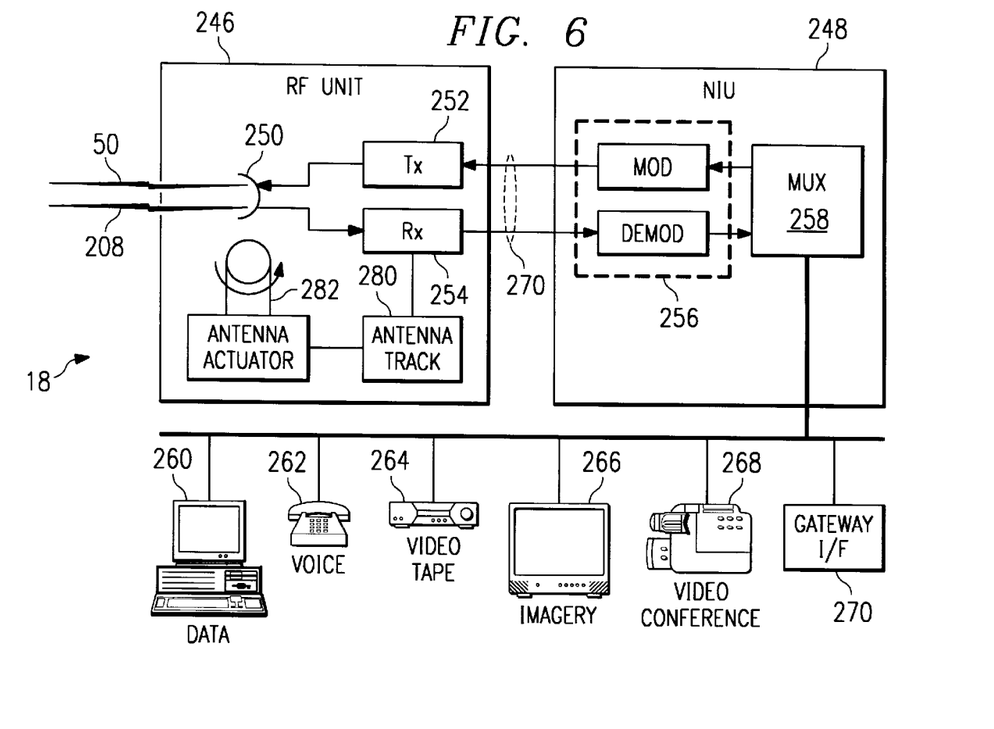
FIG. 6 illustrates in more detail components of a device that communicates with the ASN.

FIG. 6 illustrates in more detail the components of CPE 18, BPE 20, gateway 22, and more generally device 100 that communicate with ASN 14. Although this discussion focuses on the design and operation of CPE 18, any device communicating with ASN 14 may include similar components and perform similar operations.

CPE 18 includes a radiofrequency (RF) unit 246, a network interface unit (NIU) 248, and a variety of information appliances 260–270. RF unit 246 includes an antenna 250 (e.g., a 12" to 18" parabolic MMW antenna), coupled to a transmit module 252 and a receive module 254. NIU 248 includes a modem 256 coupled to transmit module 252 and receive module 254, and a multiplexer 258 coupled to a variety of information appliances, such as end-user equipment (e.g., a computer 260, a telephone 262, a video server 264, a video terminal 266, a video camera 268), gateway equipment (e.g., a gateway interface 270), and other communication, display, or processing devices. Modem 256 in NIU 248 comprises an L-band tuner and down converter, a modulator, and a demodulator.

In operation, transmit module 252 accepts an L-band (950 to 1950 MHZ) intermediate frequency (IF) input signal from the modulator in modem 256, translates this signal to MMW frequencies, amplifies the signal using a power amplifier to a transmit power level of 100 mW to 500 mW, and feeds antenna 250 for transmission to ASN 14. Receive module 254 couples a signal received from ASN 14 at antenna 250 to a low noise amplifier, down converts the signal to an L-band IF, and provides subsequent amplification and processing before outputting the signal to the demodulator in modem 256. Although transmit module 252 and receive module 254 operate in broadband, these components typically process a single 40 MHz channel at one time. Modem 256 in NIU 248 tunes to the particular channel frequency.

NIU 248 interfaces to RF unit 246 via coax pair 270, which couples the L-band transmit and receive signals between NIU 248 and RF unit 246. Each CPE 18 supports high data rates (e.g., OC-1 at 52 Mbps) in both transmit and receive directions. In some applications, CPE 18 uses some of this bandwidth to incorporate spread spectrum coding to improve performance against interference.

RF unit 246 also includes an antenna tracker having an antenna tracking module 280 and an antenna actuator 282 to point antenna 250 at ASN 14. Antenna tracking module 280 receives tracking or pilot signal 208 transmitted by the pilot transmitter 204 in ASN 14 and generates commands for antenna actuator 282 to align antenna 250 with beam 40 generated by an associated transmit/receive pair 166 in ASN 14. In a particular embodiment, antenna tracking module 280 and antenna actuator 282 support rotation about two axes to track and align with ASN 14.

Much of the equipment in CPE 18, including antenna 250, transmit module 252, receive module 254, modem 256, and multiplexer 258 may be existing components that have already been developed for local multipoint distribution service (LMDS) or other broadband data services. This reduces the cost of CPE 18 since there would be minimal cost to adapt the LMDS equipment to operate in communication system 10. Assuming operation in the LMDS band (28 GHz), CPE 18 need only incorporate antenna tracking module 280 and antenna actuator 282 into an existing LMDS design.

Figure 7:
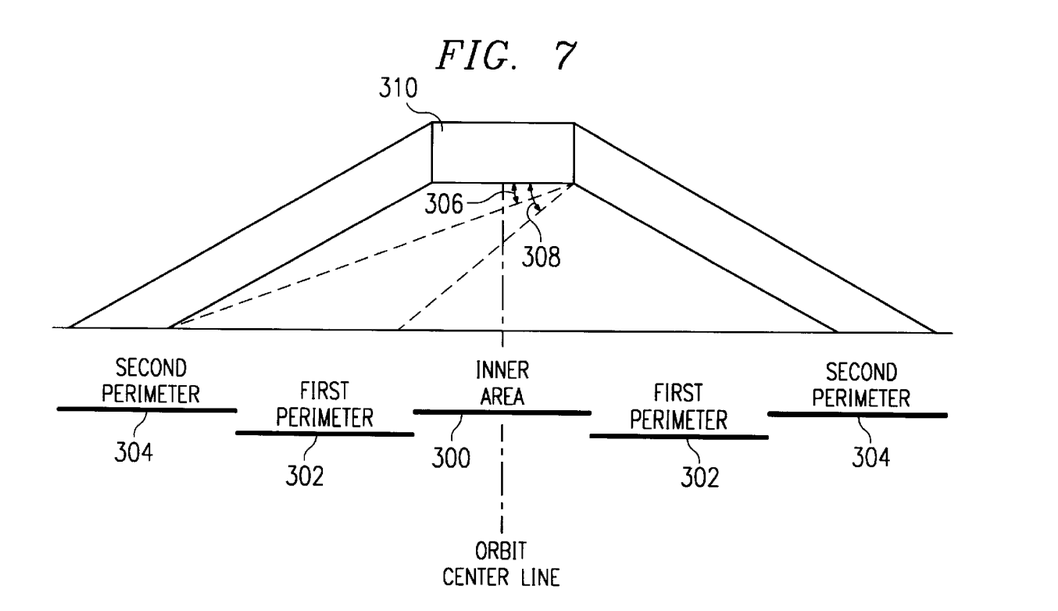
FIG. 7 illustrates the service region of the communication system.

FIG. 7 illustrates service region 16 for communication system 10. Depending on capacity, geographical coverage area, operating altitude of ASN 14, and other operational parameters, service region 16 may include an inner area 300, a first perimeter 302, and a second perimeter 304. In a typical metropolitan application, inner area 300 covers a dense urban area that may include gateways 22, first perimeter 302 covers a substantially suburban area, and second perimeter 304 covers a substantially rural area.

Communication system 10 assumes a minimum look angle 306 between ground-based devices and the further point on orbit 30 to be generally higher than twenty degrees.

This value corresponds to devices at the perimeter of service area 16. In contrast, cellular telephone designers assume that the line-of-sight from a customer to the antenna of the nearest base station is less than one degree. Communication system 10 incorporates a high minimum look angle 306 to ensure that devices have access to a solid angle swept by aircraft 12 and ASN 14 flying in orbit 30 which is free of dense objects. Also, minimum look angle 306 provides a relatively short transmission path to promote high availability of service during heavy rainfall. Minimum look angle 306 also allows communication system 10 to share a common spectrum designated for ground-based wireless networks, such as LMDS operating at 28 GHz. Isolation between communication system 10 and a ground-based system operating in the same band increases with higher frequencies using more narrow beams for transmission. A second look angle 308 defines inner area 300 of service region 16. In a particular embodiment, communication system 10 locates gateways 22 within inner area 300 to ensure reliable, continuous communication even during heavy rainfall and dense cloud cover.

The size and shape of service region 16 (e.g., inner area 300, first perimeter 302, second perimeter 304) and look angles 306 and 308 change as aircraft 12 operates at different locations within operating region 310. This allows aircraft 12 to carry ASN 14 at different altitudes and in different orbits 30 to adjust for the density of users and the size of service region 16.

Figure 8A:
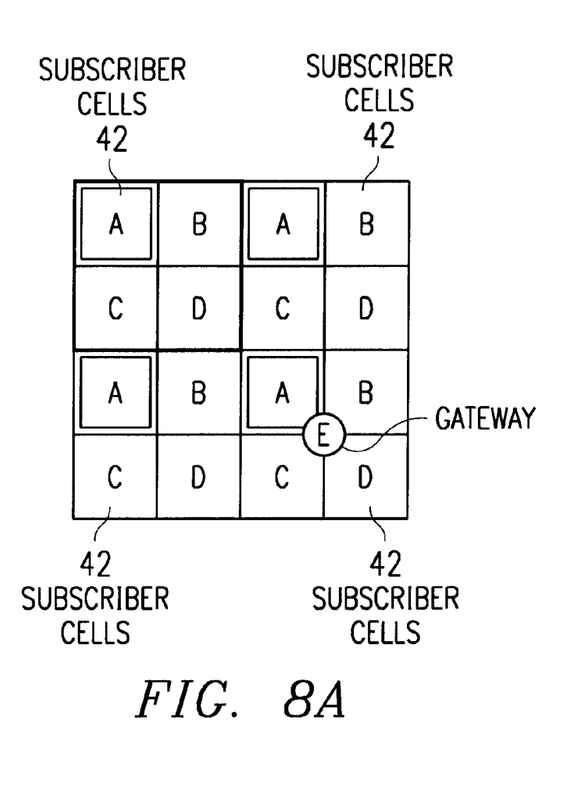
FIGS. 8A, 8B and 8C, which are collectively referred to herein as FIG. 8, illustrate the frequency division multiplexing technique used in the communication system.
Figure 8B:
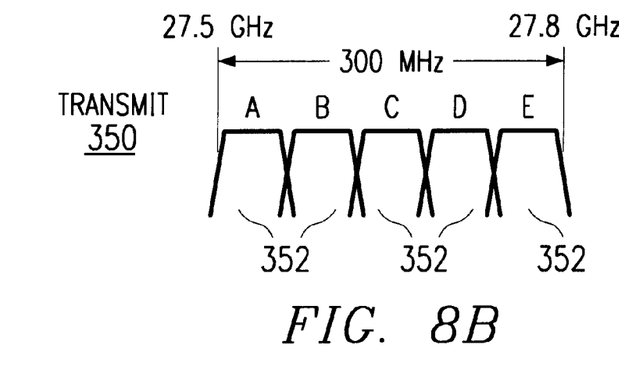
Figure 8C:
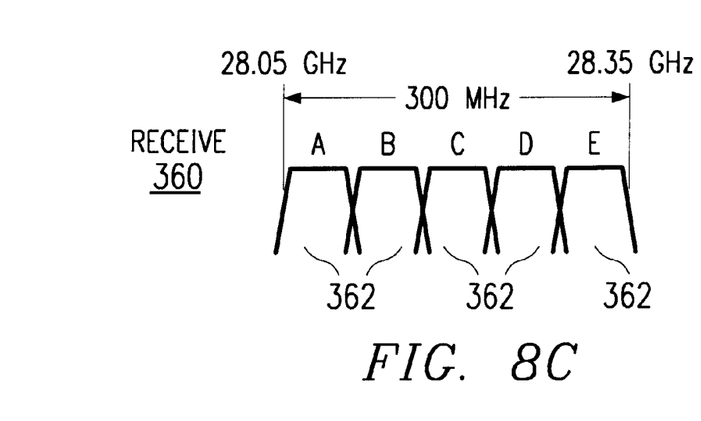

FIGS. 8A, 8B and 8C, which are collectively referred to herein as FIG. 8, illustrate in more detail the frequency division multiplexing technique used in communication system 10. In a particular embodiment, the frequency plan achieves a 5:1 reuse factor throughout service area 16. Using the LMDS band as an example, a transmit band 350 comprises five 60 MHz transmit sub-bands 352 (A, B, C, D, E) between 27.5 GHz and 27.8 GHz, and a receive band 360 comprises five 60 MHz receive sub-bands 362 (A, B, C, D, E) between 28.05 GHz and 28.35 GHz. A guard band of 250 MHz between 27.8 GHz and 28.05 GHz reduces interference between transmit band 250 and receive band 260. Each subscriber cell 42 in service region 16 corresponds to one of four sub-bands 352 and 362 (A, B, C, D) for transmit and receive links to CPE 18 and BPE 20. Each sub-band 352 and 362 corresponds to different transmit and receive frequencies, and cells 42 are arranged in such a manner so that no two adjacent cells 42 utilize the same frequency sub-bands. The fifth sub-band 352 and 362 (E) provides transmit and receive links to gateways 22. This fifth sub-band offers flexibility in the deployment and upgrade of gateways 22 without altering communication frequencies or techniques used for CPE 18 and BPE 20. With other spectrum options, such as 38 GHz, communication system 10 may adopt other similar frequency plans.

Communication system 10 uses MMW frequencies to transmit broadband wireless data and to form relatively small cells 42 in service region 16 with small antennas. Terrestrial LMDS systems use approximately 1 GHz of bandwidth at 28 GHz to provide local distribution of broadband services. Paths in these systems are almost tangential to the earth and may not exceed 5 km due to attenuation caused by rain. For airborne systems like communication system 10, minimum look angle 306 reduces the portion of the path which traverses the volume of high rainfall rates. Furthermore, high-gain antennas on components in communication system 10 produce narrow beams for formation of cells 42, which results in high gain that extends the range capability of MMW signals.

TABLE 1

Path Loss Calculations at 28 GHz

| Parameters | Value |
|---|---|
| Carrier Frequency, GHz | 28 |
| TX Power, dBm, Total | 20.00 |
| Number of Carriers | 1.00 |
| Power per Carrier, dB | 20.00 |
| TX Antenna Feed Loss, dB | 0.90 |
| TX Antenna Gain, dB | 34.00 |
| Range or Cell Radius, km | 35.00 |
| Path (Range) Loss (Free Space) (dB) | 152.02 |
| RX Antenna Gain | 34.00 |
| Received Signal Power, dBm | −64.92 |
| Boltzmann's Constant | 1.38E−23 |
| Temperature, deg Kelvin | 290 |
| Noise Density, No (dBm) | −173.98 |
| Effective Receiver NF, dB | 9.00 |
| Alpha | 0.21 |
| Code Rate, R | 0.78 |
| Modulation Order, m | 2.00 |
| Bit Rate, Mbps | 51.84 |
| RX Noise BW, MHz | 40.21 |
| RX Noise Power | −88.93 |
| Min Eb/No BER 1E−9, QPSK, Conv&R-S code r = 0.78 | 6.00 |
| Min C/N, BER 1E−9 | 4.90 |
| Implementation Loss, dB | 1.00 |
| Received C/N, dB | 23.01 |
| Clear Air Margin, dB | 18.11 |
| Rain Rate (Dallas, 99.9%), mm/hr | 63 |
| Rain Attenuation, Dallas, 99.9% | 11.2 |
| Rain Faded Margin, dB | 6.91 |

TABLE 1 summarizes the results of a typical path loss analysis in communication system 10. A link budget assumes a minimum look angle 306 of thirty degrees. A minimum look angle 306 of twenty degrees adds approximately 3 dB to the path loss. This decreases the link margin from approximately 7 dB to 4 dB. Typically, rain attenuation on LEO satellite systems at this frequency and with a look angle of about forty degrees is approximately 12 dB, whereas rain attenuation for terrestrial systems with the link essentially horizontal to the ground is approximately 18 dB.

To calculate the link budget, the slant range between ground-based devices and ASN 14 is 35 km, the gain of both the airborne and ground antennas is 34 dB, and the transmitted power by both the airborne segment and the ground segment is 100 mW at 28 GHz. For this analysis, communication system 10 uses QPSK modulation, a rate 7/8 convolutional code concatenated with a Reed-Solomon (204,188) code, and an excess bandwidth factor of 0.21 with an assumed maximum bit error rate (BER) of $10^{-9}$ to achieve an information rate equivalent to OC-1 (i.e., 51.84 Mbps). The calculations assume a rainfall rate which permits a link availability of 99.9%. The results of this analysis indicate a margin of almost 7 dB even after rain fade. Communication system 10 may increase this margin by up to 10 dB if the transmitted power were increased to 1 W, and by another 3 dB by improving the receiver noise figure.

The propagation of MMW signals is line-of-sight. Trees, as well as buildings, vehicles, and terrain, normally cause unacceptable path loss. The high minimum look angle 306 minimizes this effect, and communication system 10 assumes an unobstructed path between the transmitter and receiver. Mitigation techniques include increasing the height of the ground-based devices, providing alternative nodes, and removing blockage.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for providing communication to a plurality of devices located in a service region on earth which includes a plurality of cells, comprising an aircraft flying above the service region said aircraft having an airborne switching node which includes an antenna section, said airborne switching node being operable to:

transmit through said antenna section to the service region a plurality of directional beams in respective different directions so that each beam is associated with a respective cell in the service region;

adjust the directions of the beams relative to said aircraft, including compensation for movement of said aircraft relative to the earth; and receive through said antenna section respective signals transmitted by the plurality of devices located in the service region, and transmit each such received signal on one of the beams to one of the devices other than the device from which that signal was received.

2. The system of claim 1, wherein said airborne switching node includes an adapter that mechanically adjusts the orientation of said antenna section relative to said aircraft under control of said airborne switching node to facilitate the adjustment of the beams relative to said aircraft.

3. The system of claim 2, wherein said adapter is operable to effect tilting movement of said antenna section relative to said aircraft about at least one axis which extends approximately horizontally.

4. The system of claim 2, wherein said adapter is operable to effect rotation of said antenna section relative to said aircraft about an approximately vertical axis.

5. The system of claim 4, wherein said adapter rotates said antenna section so as to maintain a substantially constant compass orientation of said antenna section.

6. The system of claim 2, wherein said antenna section includes at least one phased array antenna which is operable to electronically effect adjustment of the directions of the beams.

7. The system of claim 1, wherein said antenna section includes at least one phased array antenna which is operable to electronically effect adjustment of the directions of the beams.

8. The system of claim 1, wherein said antenna section includes a plurality of antenna portions which are each associated with and handle the devices in a respective subset of the cells in the service region.

9. The system of claim 8, wherein each said antenna portion includes a transmit antenna and a receive antenna.

10. The system of claim 5, wherein said antenna section includes a platform having a central section with an angled rim extending therearound, one of said antenna portions being supported on said central section, and other said antenna portions being supported on said angled rim at spaced locations therealong.

11. The system of claim 10, wherein:

said antenna portion mounted on said center section is operable to direct beams to cells in a center of the service area; and said antenna portions mounted on said angled rim are operable to direct beams to respective sets of cells surrounding the center of the service region.

12. The system of claim 1, wherein said airborne switching node includes a packet switch that receives packet data through said antenna section from a first of the devices in the service region, and directs the packet data to said antenna section for transmission to a second of the devices in the service region.

13. The system of claim 1, wherein said airborne switching node includes:

a memory that stores an association between the beams and the cells, said airborne switching node updating the association in said memory upon performing a handoff of a beam between cells; and a packet switch that receives packet data though said antenna section from a first of the devices located in one of the cells, accesses said memory to determine a destination beam associated with a second of the devices located in one of the cells, and directs the packet data to said antenna section for transmission to the second device using the destination beam.

14. The system of claim 1, wherein the devices include:

a plurality of subscriber devices that each communicate with said airborne switching node using one of a plurality of first frequency bands; and a gateway device that communicates with said airborne switching node using a second frequency band different from the first frequency bands.

15. The system of claim 14, wherein said antenna section includes a first portion which facilitates communication with the subscriber devices using phased array technology, and a second portion separate from the first portion which facilitates communication with the gateway device using technology other than phased array technology.

16. The system of claim 1, wherein said airborne switching node communicates with the devices using a frequency band designated for ground-based communication.

17. The system of claim 1, wherein said airborne switching node further includes a pilot transmitter that transmits a pilot signal, and wherein at least one of the devices includes:

an antenna to receive the pilot signal; and an antenna tracker to position the antenna to point at the airborne switching node in response to the pilot signal.

18. The system of claim 1, wherein said antenna section is operable to facilitate simultaneous transmission of each of the plurality of directional beams.

19. The system of claim 1, wherein said airborne switching node is operable to communicate with a satellite.

20. The system of claim 1, including a further aircraft having thereon a further airborne switching node which provides communication to a plurality of further devices located in a further service region, said airborne switching nodes being operable to communicate with each other.

21. A system for providing communication to a plurality of devices located in a service region on earth, comprising an aircraft flying above the service region, said aircraft having an airborne switching node which includes an antenna section, said airborne switching node being operable to:

transmit through said antenna section to the service region a plurality of directional beams in respective different directions;

hand off each of the devices in the service region from beam to beam as needed to compensate for movement of said aircraft relative to the earth; and receive through said antenna section respective signals transmitted by the plurality of devices located in the service region, and transmit each such received signal on one of the beams to one of the devices other than the device from which that signal was received.

22. The system of claim 21, wherein said antenna section includes phased array technology and is operable to electronically direct the beams in their respective directions.

23. The system of claim 21, wherein said airborne switching node includes a packet switch that receives packet data through said antenna section from a first of the devices in the service region, and directs the packet data to said antenna section for transmission to a second of the devices in the service region.

24. The system of claim 21, wherein said airborne switching node includes:
a memory that stores an association between the beams and the devices, said airborne switching node updating the association in said memory upon performing a handoff of a device between beams; and
a packet switch that receives packet data through said antenna section from a first one of the devices, accesses said memory to determine a destination beam associated with a second one of the devices, and directs the packet data to said antenna section for transmission to the second device using the destination beam.

25. The system of claim 21, wherein said airborne switching node communicates with the devices using a frequency band designated for ground-based communication.

26. The system of claim 21, wherein said airborne switching node includes a pilot transmitter that transmits a pilot signal to enable ground-based antenna tracking.

27. The system of claim 21, wherein said antenna section includes a plurality of antenna portions, and includes a platform having a central section with an angled rim extending therearound, said central section having thereon one of said antenna portions which facilitates communication with a central portion of the service region, and said angled rim having thereon at spaced locations therealong a plurality of the antenna portions which each facilitate communication with respective portions of the service region disposed around the central portion thereof.

28. The system of claim 27, wherein each of said antenna portions includes a transmit antenna and a receive antenna.

29. The system of claim 21, wherein said antenna section is operable to facilitate simultaneous transmission of each of the plurality of directional beams.

30. The system of claim 21, wherein said airborne switching node is operable to communicate with a satellite.

31. The system of claim 21, including a further aircraft having thereon a further airborne switching node which provides communication to a plurality of further devices located in a further service region, said airborne switching nodes being operable to communicate with each other.

32. The system of claim 21, wherein said airborne switching node includes an adapter that mechanically adjusts the orientation of said antenna section relative to said aircraft under control of said airborne switching node to facilitate the adjustment of the beams relative to said aircraft.

33. The system of claim 21, wherein the devices include a plurality of subscriber devices that each communicate with said airborne switching node using one of a plurality of first frequency bands, and a gateway device that communicates with said airborne switching node using a second frequency band different from the first frequency bands; said antenna section including a first portion which facilitates communication with the subscriber devices using phased array technology, and a second portion separate from the first portion which facilitates communication with the gateway device using technology other than phased array technology.

34. A method for providing communication to a plurality of devices located in a service region which is on earth and which includes a plurality of cells, comprising the steps of:
flying an aircraft above the service region, said aircraft having an airborne switching node that includes an antenna section;
transmitting through said antenna section a plurality of directional beams in respective different directions to the service region, so that each beam is associated with a respective cell in the service region;
adjusting the directions of the beams relative to said aircraft, including compensation for movement of said aircraft relative to the earth; and
receiving through said antenna section respective signals transmitted by the plurality of devices located in the service region, and transmitting each such received signal on one of the beams to one of the devices other than the device from which that signal was received.

35. The method of claim 34, wherein said adjusting step includes the step of electronically adjusting the directions of the beams relative to said aircraft.

36. The method of claim 34, wherein said adjusting step includes the step of mechanically adjusting the orientation of said antenna section relative to said aircraft to adjust the directions of the beams relative to said aircraft.

37. The method of claim 36, wherein said mechanically adjusting step includes the step of rotating said antenna section relative to said aircraft so as to maintain a substantially constant compass orientation of said antenna section.

38. The method of claim 34, wherein said airborne switching node includes a memory storing an association between the beams and the cells, and including the step of updating the association in said memory upon performing a handoff of a beam between cells.

39. The method of claim 34, including the step of causing said antenna section to communicate with the devices using a frequency band designated for ground-based communication.

40. The method of claim 34, further comprising the step of causing said antenna section to transmit a pilot signal to enable ground-based antenna tracking.

41. The method of claim 34, wherein the devices include a plurality of subscriber devices and a gateway device; and including the steps of:
causing the subscriber devices to each communicate with said airborne switching node using one of a plurality of first frequency bands; and
causing the gateway device to communicate with said airborne switching node using a second frequency band different from the first frequency bands.

42. A method according to claim 34, including the step of causing said antenna section to facilitate simultaneous transmission of each of the plurality of directional beams.

43. A method for providing communication to a plurality of devices located in a service region on earth, comprising the steps of:
flying an aircraft above the service region, said aircraft having an airborne switching node which includes an antenna section;
transmitting through said antenna section to the service region a plurality of directional beams in respective different directions;
handing off each of the devices in the service region from beam to beam as needed to compensate for movement of said aircraft relative to the earth; and
receiving through said antenna section respective signals transmitted by the plurality of devices located in the service region, and transmitting each such received signal on one of the beams to one of the devices other than the device from which that signal was received.

44. The method of claim 43, wherein said antenna section includes phased array technology, and including the step of electronically directing the beams in their respective directions.

45. The method of claim 43, wherein said airborne switching node includes a memory storing an association between the beams and the devices, and including the step of updating the association in said memory upon performing a handoff of a device between beams.

46. The method of claim 43, including the step of causing said airborne switching node to communicate with the devices using a frequency band designated for ground-based communication.

47. The method of claim 43, including the step of causing said antenna section to transmit a pilot signal to enable ground-based antenna tracking.

48. The system of claim 43, including the step of causing said antenna section to facilitate simultaneous transmission of each of the plurality of directional beams.

* * * * *

UNITED STATES PATENT AND TRADEMARK OFFICE
CERTIFICATE OF CORRECTION

PATENT NO. : 6,061,562
DATED : May 9, 2000
INVENTOR(S) : James N. Martin et al.

It is certified that error appears in the above-identified patent and that said Letters Patent is hereby corrected as shown below:

Title page,
Item [56], References Cited, OTHER PUBLICATIONS,
after "Sep." delete "997" and insert -- 1997 --; and
after "Broadband" delete "Wireland" and insert -- Wireless --.

Column 13,
Line 53, after "claim" delete "5" and insert -- 8 --.

Signed and Sealed this

Twenty-third Day of December, 2003

JAMES E. ROGAN
*Director of the United States Patent and Trademark Office*